(12) United States Patent
Liu et al.

(10) Patent No.: US 10,069,393 B2
(45) Date of Patent: Sep. 4, 2018

(54) DUAL DIAMAGNETIC LINEAR RESONANT ACTUATOR

(71) Applicant: TOPRAY MEMS INC., Hsinchu (TW)

(72) Inventors: Chin-Sung Liu, Hsinchu (TW); Hsiao-Ming Chien, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 210 days.

(21) Appl. No.: 15/159,360

(22) Filed: May 19, 2016

(65) Prior Publication Data

US 2017/0222531 A1    Aug. 3, 2017

(30) Foreign Application Priority Data

Jan. 29, 2016   (TW) .............................. 105201484 U (51) Int. Cl.
  *H02K 33/16*   (2006.01)
  *H02K 33/02*   (2006.01)
(52) U.S. Cl.
  CPC ................................... *H02K 33/02* (2013.01)
(58) Field of Classification Search
  CPC ........ H02K 33/16; H02K 33/02; H02K 33/10; H02K 41/02; H02K 41/031; H02K 41/0356; H02K 1/34; H02K 5/173
  USPC ....... 310/30, 28, 12.21, 12.24, 12.25, 12.31, 310/12.09
  See application file for complete search history.

(56) References Cited

U.S. PATENT DOCUMENTS

| 4,545,117 A * | 10/1985 | Okamoto | H02K 41/03 310/12.25 |
| 2008/0258567 A1 * | 10/2008 | Mukaide | H02K 41/03 310/12.22 |
| 2011/0210689 A1 * | 9/2011 | Vogel | H02K 41/031 310/12.04 |

* cited by examiner

*Primary Examiner* — Michael Andrews
(74) *Attorney, Agent, or Firm* — Rabin & Berdo, P.C.

(57) ABSTRACT

A dual diamagnetic linear resonant actuator includes a magnetic induction element, a magnet set and a coil. The magnet set comprises four magnets. The N pole of first magnet, the N pole of second magnet, the S pole of third magnet and the S pole of fourth magnet press respectively against the first, second, third and fourth sides of the magnet induction element. The coil surrounds the magnetic induction element and the third and fourth magnets, and maintains a distance from the first end and the second end of the magnetic induction element, and from the N pole of the third and fourth magnets. As such, the first and second magnets compress magnetic field lines, and the third and fourth magnets strengthen the magnetic force, and guide the magnetic field lines towards the coil to accomplish concentration of magnetic field density and to avoid divergence of the magnetic field lines.

7 Claims, 8 Drawing Sheets

DUAL DIAMAGNETIC LINEAR RESONANT ACTUATOR

CROSS-REFERENCE TO RELATED APPLICATION

The present application is based on, and claims priority form, Taiwan Patent Application No. 105201484, filed Jan. 29, 2016, the disclosure of which is hereby incorporated by reference herein in its entirety.

TECHNICAL FIELD

The technical field generally relates to a linear resonant actuator, and in particular, to a dual diamagnetic linear resonant actuator based on resonance generated by electromagnetic effect.

BACKGROUND

The resonance of portable electronic devices, such as, mobile phones or tablet PCs, is generated by a resonant device inside the portable electronic device. The earlier resonant device often relies on eccentric rotating mass (ERM) vibration motor to provide resonance.

Recently, a trend is forming by replacing the ERM vibration motor with a linear resonant actuator to serve as the resonant device. The reason is that the linear resonant actuator utilizes electromagnetic effect to generate resonance, which is fast in response and low in power-consumption. Moreover, with the use of ball-bearing design, the resonance frequency can be generated.

However, the magnetic field of the known linear resonant actuator is prone to diverge, and cannot be effectively guided to pointing towards the coils, which results in low utilization efficiency of the magnetic field.

Furthermore, the known linear resonant actuator is unable to make the entire coils completely overlap the magnetic field, which leads to a portion of coils unable to utilize the magnetic field after connected to electricity.

Hence, it is desirable to provide a linear resonant actuator, which is able to improve the density of the magnetic field, and guide the direction of the magnetic field pointing to the coils and effectively using the entire magnetic field.

SUMMARY

The primary object of the present invention is to provide a dual diamagnetic linear resonant actuator, able to improve density of magnetic field and guide the direction of the magnetic field pointing to the coils to prevent the lines of magnetic field from divergence, and increase the utilization efficiency of the magnetic field.

Another object of the present invention is to provide a dual diamagnetic linear resonant actuator, with the entire coils completely overlapping the magnetic field to fully utilize the entire magnetic field.

To achieve the aforementioned objects, the present invention provides a dual diamagnetic linear resonant actuator, comprising: a magnetic induction element, a magnet set and a coil.

The magnetic induction element has a first end, a second end, a first side, a second side, a third side and a fourth side, wherein the first side and the second side are opposite to each other, while the third side and the fourth side are opposite to each other, The magnet set comprises a first magnet, a second magnet, a third magnet, and a fourth magnet. The first magnet has an S pole and an N pole. The N pole of the first magnet presses against the first side of the magnet induction element. The second magnet has an S pole and an N pole. The N pole of the second magnet presses against the second side of the magnet induction element. The third magnet has an S pole and an N pole. The S pole of the third magnet presses against the third side of the magnet induction element. The fourth magnet has an S pole arid an N pole. The S pole of the fourth magnet presses against the fourth side of the magnet induction element.

The coil surrounds the magnetic induction element, the third magnet and the fourth magnet, and maintains a distance from the first end and the second end of the magnetic induction element, and from the N pole of the third magnet and the N pole of the fourth magnet.

According to a preferred embodiment, the magnetic induction element has a thickness greater than the thickness of the third and the fourth magnets, wherein the first and the second magnets have the same size specification, and the third and the fourth magnets have the same size specification. Preferably, the combined thickness of the magnet induction element, the third magnet and the fourth magnet is greater than the thickness of the first and the second magnets. Preferably, the third magnet has at least a half portion protruding above the level of the top of first and the second magnets, and the fourth magnet has at least a half portion protruding below the level of the bottom of the first and the second magnets; preferably, the first, second, third and fourth magnet and the magnetic induction element have the same length; the third and the fourth magnets have the same width as the magnetic induction element; the center of the N pole of the first and the second magnets presses respectively against the first side and the second side of the magnetic induction element; the part of the N pole of the first and the second magnets near the top and the bottom of the first and the second magnets presses against the two sides of the third and the fourth magnets.

According to a preferred embodiment, the thickness of the magnetic induction element is greater than the thickness of the third and the fourth magnets, wherein the first and the second magnets have the same size specification, and the third and the fourth magnets have the same size specification. Preferably, the combined thickness of the magnet induction element, the third magnet and the fourth magnet is greater than the thickness of the first and the second magnets. Preferably, the thickness of the magnetic induction element is the same as the thickness of the first and the second magnets. Preferably, the first, second, third and fourth magnet and the magnetic induction element have the same, length; the third and the fourth magnets have the same width as the magnetic induction element.

According to a preferred embodiment, the thickness of the magnetic induction element is greater than the thickness of the third and the fourth magnets, wherein the first and the second magnets have the same size specification, and the third and the fourth magnets have the same size specification. Preferably, the thickness of the first and the second magnets is the same as the combined thickness of the third magnet and the fourth magnet. Preferably, the first, second, third and fourth magnet and the magnetic induction element have the same length; the third and the fourth magnets have the same width as the magnetic induction element. The center of the N pole of the first and the second magnets presses respectively against the first side and the second side of the magnetic induction element; the part of the N pole of the first and the second magnets near the top and the bottom of the first and the second magnets presses against the twosides of the third and the fourth magnets.

According to a preferred embodiment, the width of the coil is the same as the width of the third and the fourth magnet.

According to a preferred embodiment, the dual diamagnetic linear resonant actuator further comprises: an inner sliding track set and an outer sliding track set. The inner sliding track set comprises at least two bases and a plurality of roller balls. The two bases are disposed respectively at the first magnet and the second magnet, and respectively form a plurality of inner side tracks. The roller balls are movably disposed at the plurality of inner side tracks. The outer sliding track set comprises two outer side tracks. The coil is fixed to the two outer side tracks, and the roller balls respectively contact the two outer side tracks.

The advantages of the present invention lies in that the first and the second magnets will compress the line of the magnetic field, and the third and the fourth magnet will strengthen the magnetic force, and guide the lines of the magnetic field towards the coil to accomplish improving the magnetic field concentration density as well as guiding the magnetic field towards the coil to avoid the lines of magnetic field divergence. As such, the utilization efficiency of the magnetic field is improved. Moreover, the coil and the magnetic field completely overlap with each other, and the magnetic field is fully The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
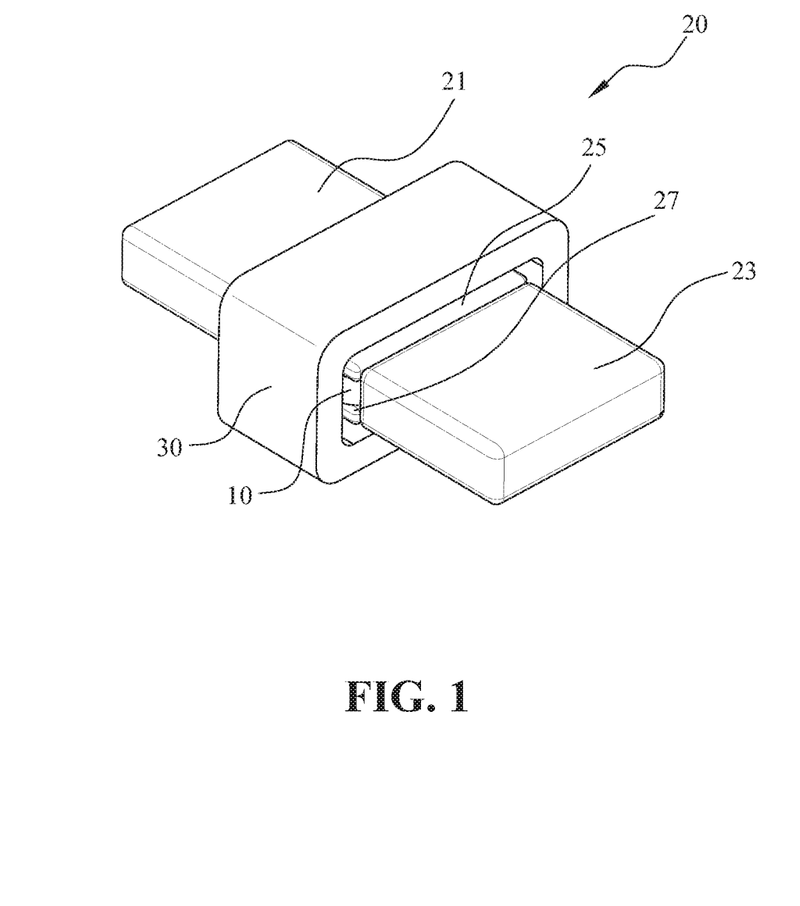
FIG. 1 shows a schematic view of a first embodiment of the dual diamagnetic linear resonant actuator in accordance with an exemplary embodiment.
Figure 2:
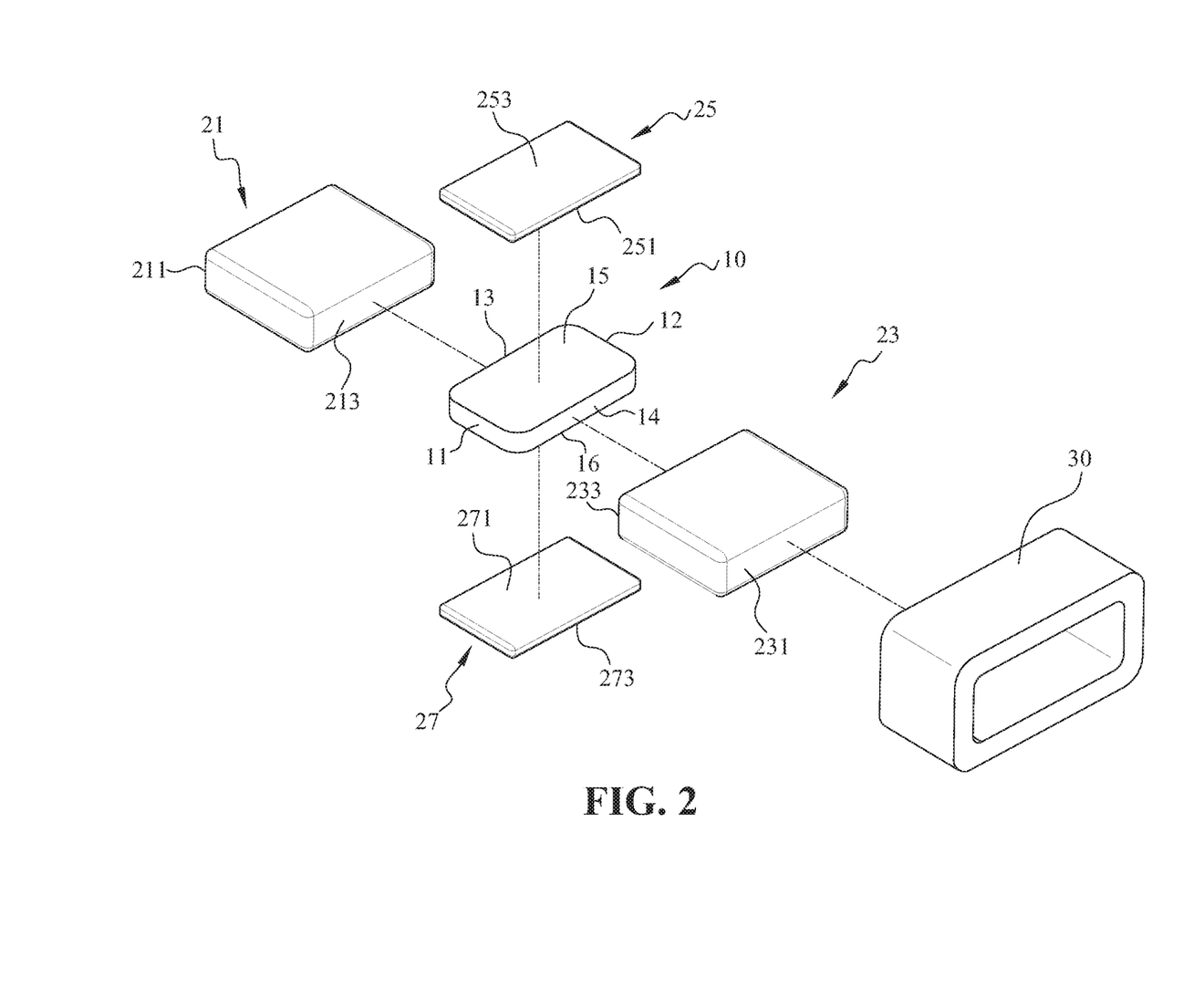
FIG. 2 shows dissected view of the first embodiment of the dual diamagnetic linear resonant actuator in accordance with an exemplary embodiment.
Figure 3:
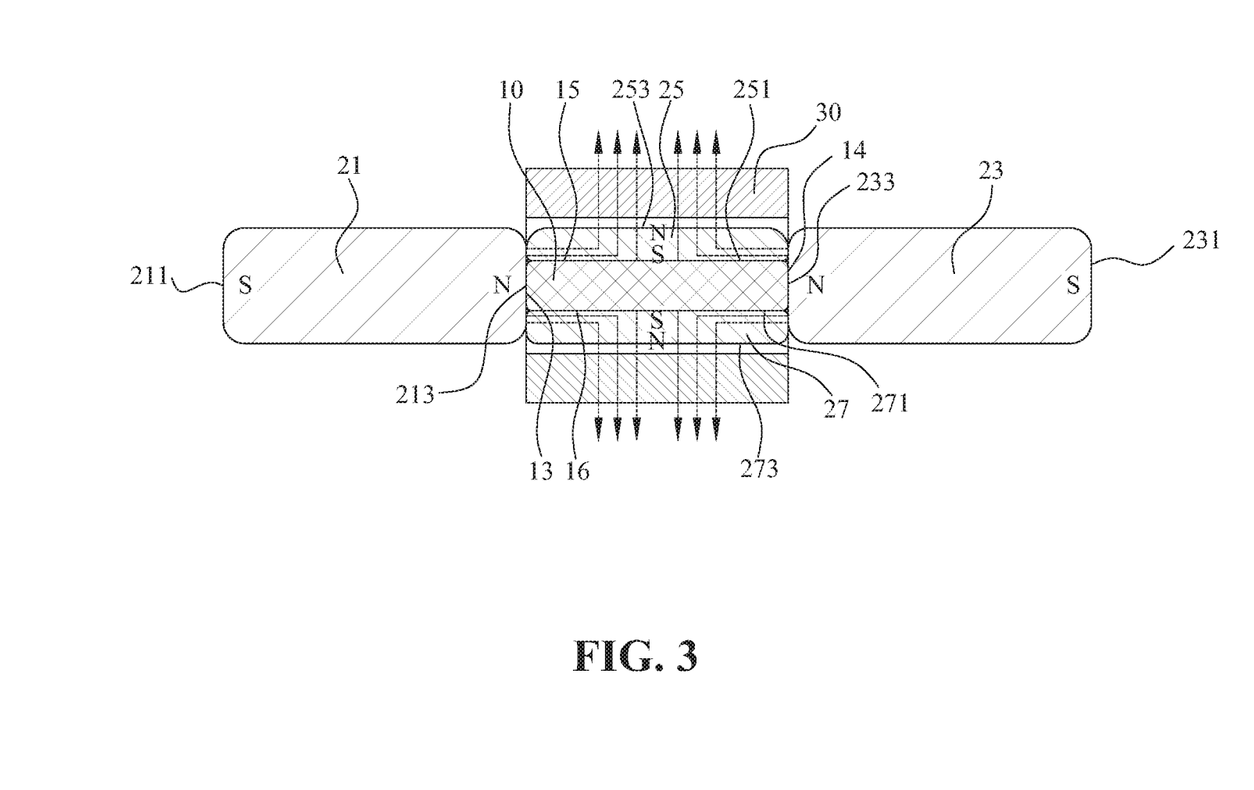
FIG. 3 shows a schematic view of the first embodiment of the dual diamagnetic linear resonant actuator with concentrated magnetic field density and guiding magnetic field towards coil in accordance with an exemplary embodiment.

Refer to FIGS. 1-3. FIG. 1 shows a schematic view of a first embodiment of the dual diamagnetic linear resonant actuator in accordance with an exemplary embodiment; FIG. 2 shows dissected view of the first embodiment of the dual diamagnetic linear resonant actuator in accordance with an exemplary embodiment; and FIG. 3 shows a schematic view of the first embodiment of the dual diamagnetic linear resonant actuator with concentrated magnetic field density and guiding magnetic field towards coil in accordance with an exemplary embodiment. The present invention provides a dual diamagnetic linear resonant actuator, comprising: a magnetic induction element 10, a magnet set 20 and a coil 30.

The magnetic induction element 10 has a first end 11, a second end 12, a first side 13, a second side 14, a third side 15 and a fourth side 16, wherein the first side 13 and the second side 14 are opposite to each other, while the third side 15 and the fourth side 16 are opposite to each other.

The magnet set 20 comprises a first magnet 21, a second magnet 23, a third magnet 25, and a fourth magnet 27. The first magnet 21 has an S pole 211 and an N pole 213. The N pole 213 of the first magnet 211 presses against the first side 13 of the magnet induction element 10. The second magnet 23 has an S pole 231 and an N pole 233. The N pole 231 of the second magnet 23 presses against the second side 14 of the magnet induction element 10. The third magnet 25 has an S pole 251 and an N pole 253. The S pole 251 of the third magnet 25 presses against the third side 15 of the magnet induction element 10. The fourth magnet 27 has an S pole 271 and an N pole 273. The S pole 271of the fourth magnet 27 presses against the fourth side 16 of the magnet induction element 10.

The coil 30 surrounds the magnetic induction element 10, the third magnet 25 and the fourth magnet 27, and maintains a distance from the first end 11 and the second end 12 of the magnetic induction element 10, and from the N pole 253 of the third magnet 25 and the N pole 273 of the fourth magnet 27.

In the first embodiment, the magnetic induction element 10 is a cuboid. The distance between the first end 11 and the second end 12 is the length of the cuboid. The distance between the first side 13 and the second side 14 is the width of the cuboid. The distance between the third side 15 and the fourth side 16 is the height (i.e., thickness). The thickness of the magnetic induction element 10 is greater than the thickness of the third and the fourth magnets 25, 27. Preferably, the first and the second magnets 21, 23 are cuboids of the same size, and the third and the fourth magnets 25, 27are cuboids of the same size. In other words, the first and the second magnets 21, 23 have the same length, width and height (i.e., thickness), and the third and the fourth magnets 25, 27 have the same length, width and height (i.e., thickness). Preferably, the combined thickness of the magnetic induction element 10, the third magnet 25 and the fourth magnet 27 is the same as the thickness of the first and the second magnets 21, 23. Preferably, the first, second, third and fourth magnets 21, 23, 25, 27 have the same length as the magnetic induction element 10; the third and the fourth magnets 25, 27 have the same width as the magnetic induction element 10; the center of the N pole 213, 233 of the first and the second magnets 21, 23 presses respectively against the first side 13 and the second side 14 of the magnetic induction element 10; the part of the N pole 213, 233 of the first and the second magnets 21, 23 near the top and the bottom of the first and the second magnets 21, 23 presses against the two sides of the third and the fourth magnets 25, 27.

Figure 4:
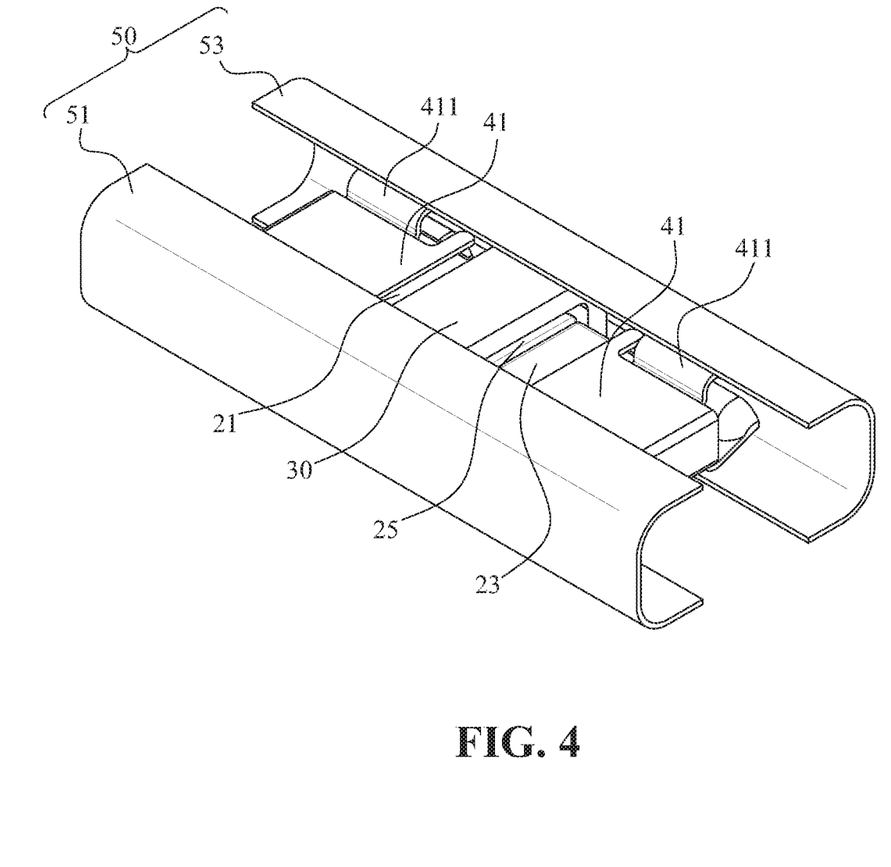
FIG. 4 shows a schematic view of the first embodiment of the dual diamagnetic linear resonant actuator, including inner sliding track set and outer sliding track set in accordance with an exemplary embodiment.
Figure 5:
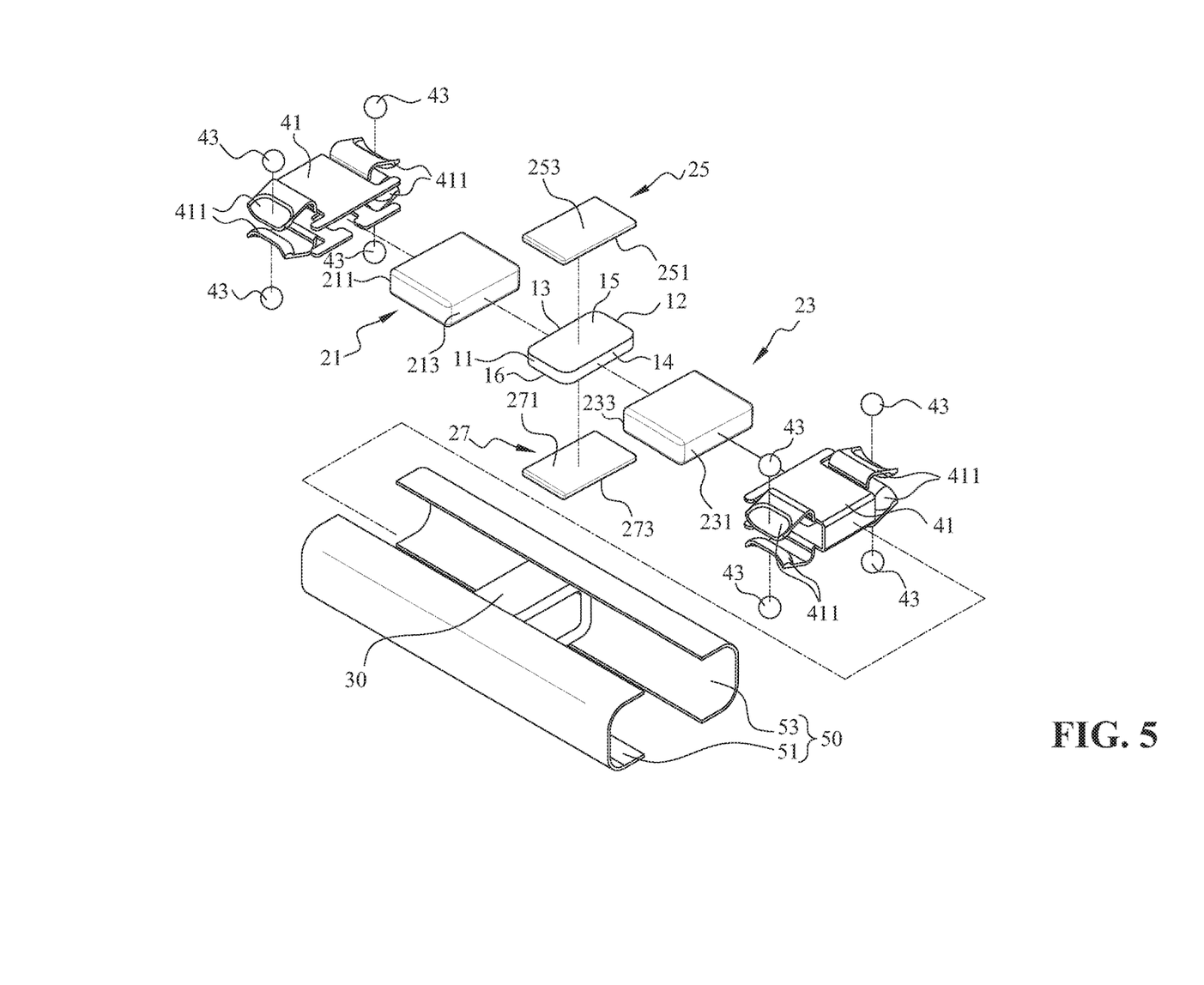
FIG. 5 shows a dissected view of the first embodiment of the dual diamagnetic linear resonant actuator, including inner sliding track set and outer sliding track set in accordance with an exemplary embodiment.
Figure 6:
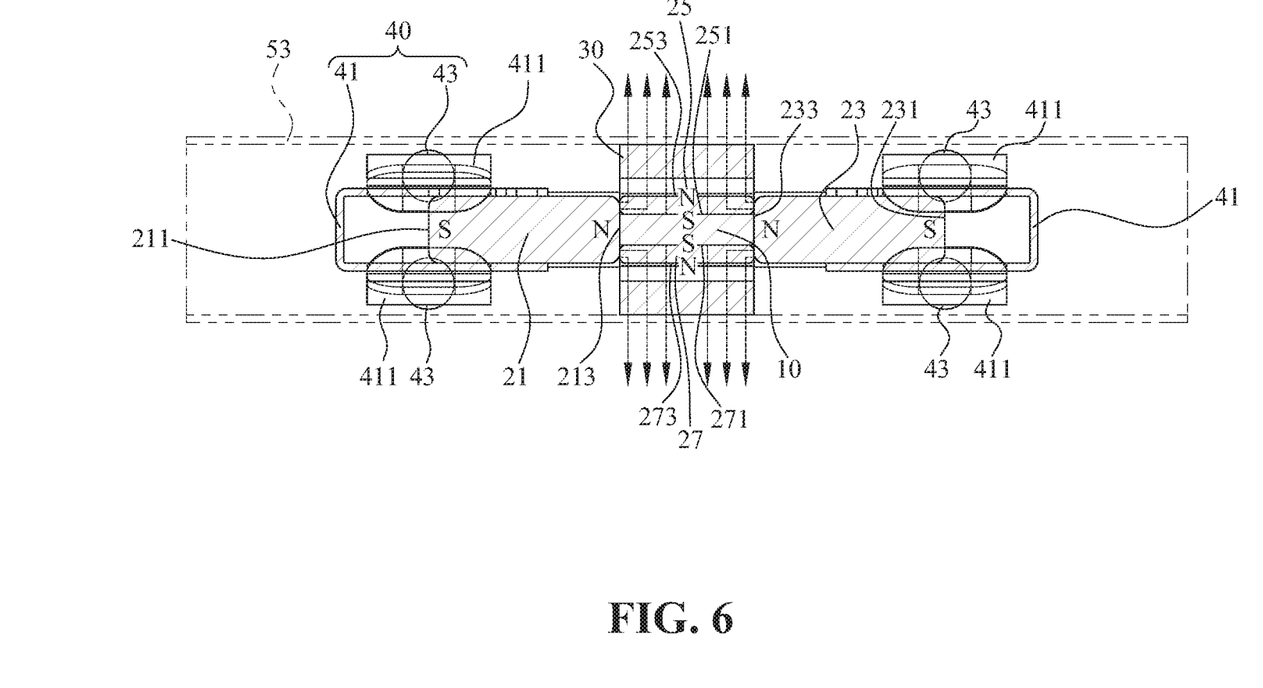
FIG. 6 shows a schematic view of the first embodiment of the dual diamagnetic linear resonant actuator, including inner sliding track set and outer sliding track set, with concentrated magnetic field density and guiding magnetic field towards coil in accordance with an exemplary embodiment.

Refer to FIGS. 4-6. FIG. 4 shows a schematic view of the first embodiment of the dual diamagnetic linear resonant actuator, including inner sliding track set and outer sliding track set in accordance with an exemplary embodiment; FIG. 5 shows a dissected view of the first embodiment of the dual diamagnetic linear resonant actuator, including inner sliding track set and outer sliding track set in accordance with an exemplary embodiment; and FIG. 6 shows a schematic view of the first embodiment of the dual diamagnetic linear resonant actuator, including inner sliding track set and outer sliding track set, with concentrated magnetic field density and guiding magnetic field towards coil in accordance with an exemplary embodiment. The dual diamagnetic linear resonant actuator further comprises: an inner sliding track set 40 and an outer sliding track set 50. The inner sliding track set 40 comprises at least two bases 41 and a plurality of roller balls 43. The two bases 41 are disposed respectively at the first magnet 21 and the second magnet 23, and respectively form a plurality of inner side tracks 411. The roller balls 43 are movably disposed at the plurality of inner side tracks 411. The outer sliding track set 50 comprises two outer side tracks 51, 53. The coil 30 is fixed to the two outer side tracks 51, 53, and the roller balls 43 respectively contact the two outer side tracks 51, 53. In the present embodiment, the inner sliding track set 40 comprises eight roller balls 43, and each base 41 forms two inner side tracks 411 on two sides respectively. The two inner side tracks 411 are disposed corresponding to each other in upper and lower positions respectively. As such, the magnetic induction element 10, the magnet set 20 and the inner sliding track set 40 form a movable part. The coil 30 and the outer sliding track set 50 form a fixed part. Four roller balls 43 located at one side of the movable part contact one of the outer side track 51, and the other four roller balls 43 located at the other side of the movable part contact the other outer side track 53.

Figure 7A:
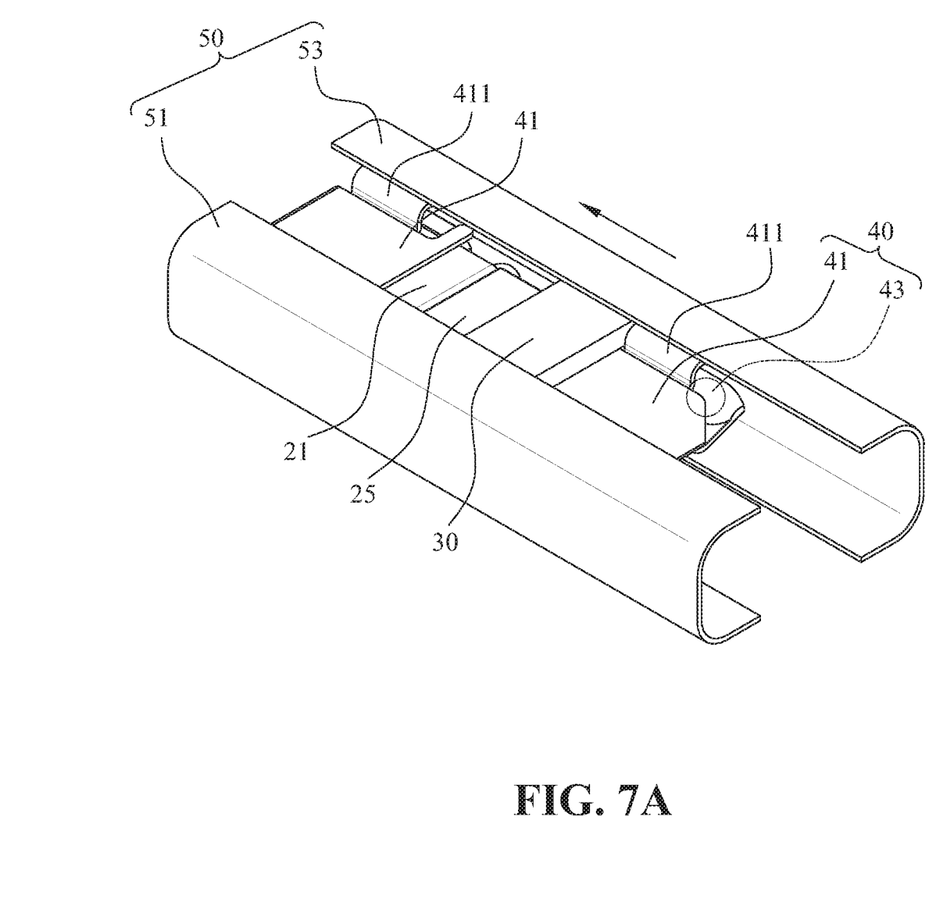
FIG. 7A shows a dissected view of the first embodiment of the dual diamagnetic linear resonant actuator with the movable part moving left with respect to the fixed part in accordance with an exemplary embodiment.
Figure 7B:
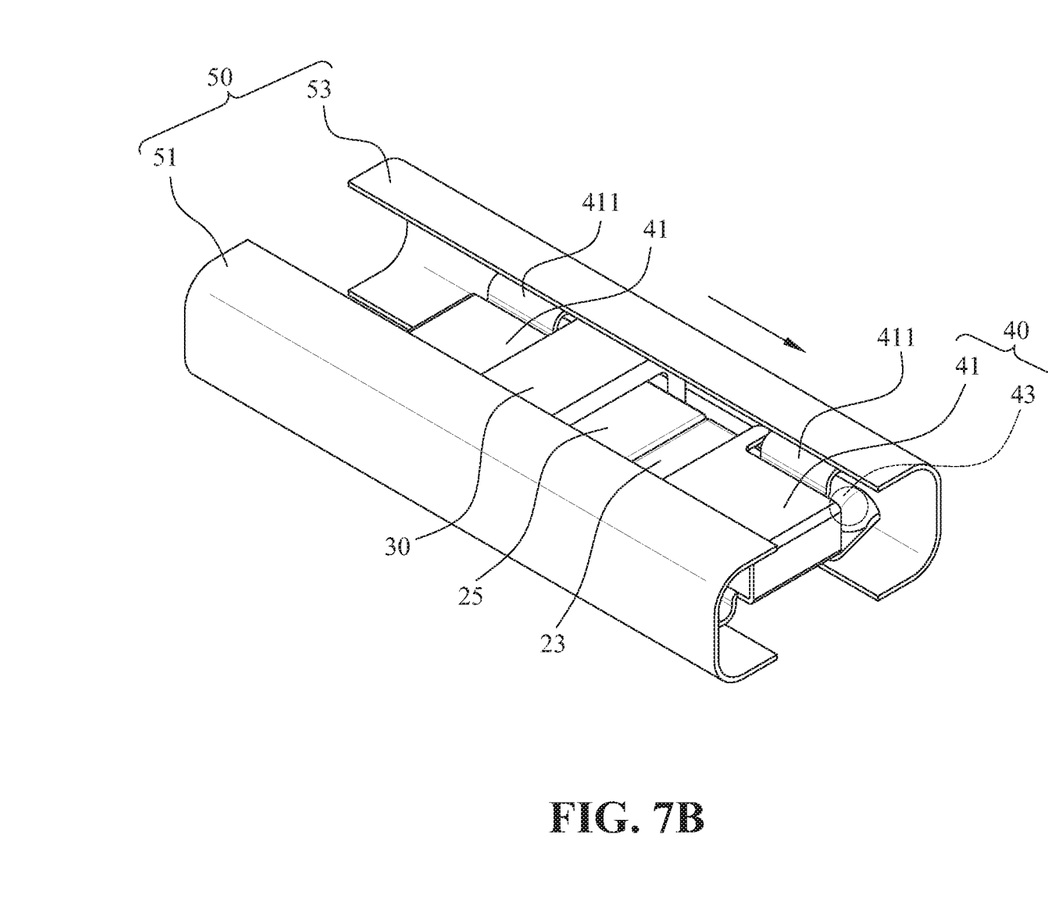
FIG. 7B shows a dissected view of the first embodiment of the dual diamagnetic linear resonant actuator with the movable part moving right with respect to the fixed part in accordance with an exemplary embodiment.

Refer to FIG. 3, FIG. 6, FIG. 7A and FIG. 7B. FIG. 3 shows a schematic view of the first embodiment of the dual diamagnetic linear resonant actuator with concentrated magnetic field density and guiding magnetic field towards coil in accordance with an exemplary embodiment; FIG. 6 shows a schematic view of the first embodiment of the dual diamagnetic linear resonant actuator, including inner sliding track set and outer sliding track set, with concentrated magnetic field density and guiding magnetic field towards coil in accordance with an exemplary embodiment; FIG. 7A shows a dissected view of the first embodiment of the dual diamagnetic linear resonant actuator with the movable part moving left with respect to the fixed part in accordance with an exemplary embodiment; and FIG. 7B shows a dissected view of the first embodiment of the dual diamagnetic linear resonant actuator with the movable part moving right with respect to the fixed part in accordance with an exemplary embodiment. When the electricity runs through coil 30 continuously in alternating directions, the current through the coil 30 interacts with the magnetic field coming out of the magnet set 20 to generate Lorentz force. As such, the movable part can move to left and right with respect to the fixed part in a simple harmonic motion manner, as shown in FIGS. &A and &B. When the frequency of the simple harmonic motion reaches the resonance state of the present invention, the present invention will reach the maximum resonant state.

In a second embodiment of the present invention (not shown), the combined thickness of the magnetic induction element 10, the third magnet 25, and the fourth magnet 27 is greater than the thickness of the first and the second magnets 21, 23. Preferably, at least a half portion of the third magnet 25 protrudes above the top level of the first and the second magnets 21, 23; and at least a half portion of the fourth magnet 27 protrudes below the bottom level of the first and the second magnets 21, 23.

In the third embodiment of the present invention (not shown), the thickness of the magnetic induction element 10 is the same as the thickness of the first and the second magnets 21, 23. As such, the entire surfaces of the N poles 213, 233 of the first and the second magnets 21, 23 press against the first side 13 and the second side 14 of the magnetic induction element 10, and not against the two sides of the third and the fourth magnets 25, 27.

In the dual diamagnetic linear resonant actuator of the present invention, the N poles 213, 233 of the first and the second magnets 21, 23 press respectively against the first side 13 and the second side 14 of the magnetic induction element 10, the S poles 251, 271 of the third and fourth magnets 25, 27 press respectively against the third side 15 and the fourth side 16 of the magnetic induction element 10, the coil 30 surrounds the magnetic induction element 10, the third magnet 25 and the fourth magnet 27, and maintains a distance from the first end 11, the second end 12 of the magnetic induction element 10 and from the N poles 253, 273 of the third and the fourth magnets 25, 27. As such, the first and the second magnets 21, 23 will compress the lines of magnetic force, and the third and fourth magnets 25, 27 will strengthen the magnetic force and guide the lines of magnetic force towards the coil 30 to achieve concentrating the density of the magnetic field and guiding the magnetic field towards the coil 30 to avoid divergence of lines of magnetic force and improve utilization efficiency of the magnetic field.

Moreover, the thickness of the magnetic induction element 10 is greater than the third and the fourth magnets 25, 27. As such, the effect of concentrating the density of the magnetic field and guiding the magnetic field towards the coil 30 is even better, and can reduce the possibility of mutual repellence among the first, the second, the third and the fourth magnets 21, 23, 25, 27. The result is even more prominent when the thickness of the magnetic induction element 10 is much thicker than the third and the fourth magnets 25, 27. In particular, when the combined thickness of the magnetic induction element 10, the third element 25, and the fourth magnet 27 is greater than the first and the second magnets 21, 23, the effect of concentrating the density of the magnetic field and guiding the magnetic field towards the coil 30 is even better.

The technical feature of "at least a half portion of the third magnet 25 protrudes above the top level of the first and the second magnets 21, 23; and at least a half portion of the fourth magnet 27 protrudes below the bottom level of the first and the second magnets 21, 23" described in the second embodiment, when combined with the aforementioned technical feature, the effect of concentrating the density of the magnetic field and guiding the magnetic field towards the coil 30 is even better. When further combined with the technical feature of "the length of the first, the second, the third and the fourth magnets 21, 23, 25, 27 is the same as the magnetic induction element 10, the center of the N poles 213, 233 of the first and the second magnets 21, 23 presses respectively against the first side 13 and the second side 14 of the magnetic induction element 10, the part of the N poles 213, 233 of the first and the second magnets 21, 23 near the top and bottom of the first and the second magnets 21, 23 partially presses against the two sides of the third and the fourth magnets 25, 27", the effect of concentrating the density of the magnetic field and guiding the magnetic field towards the coil 30 is even more prominent.

Furthermore, the technical feature of "the thickness of the magnetic induction element 10 is the same as the first and the second magnets 21, 23" described in the third embodiment, when combined with the aforementioned technical feature, the effect of concentrating the density of the magnetic field and guiding the magnetic field towards the coil 30 is even better. If further combined with the technical feature of "the length of the first, the second, the third and the fourth magnets 21, 23, 25, 27 is the same as the magnetic induction element 10, and the width of the third and the fourth magnets 25, 27 is the same as the magnetic induction element 10", the effect of concentrating the density of the magnetic field and guiding the magnetic field towards the coil 30 is even more prominent.

Also, the technical feature of "the thickness of the first and the second magnets 21, 23 is the same as the combined thickness of the magnetic induction element 10, the third magnet 25 and the fourth magnet 27" described in the first embodiment ahs the advantage of easy to assemble. If further combined with the technical feature of "the length of the first, the second, the third and the fourth magnets 21, 23, 25, 27 is the same as the magnetic induction element 10, the center of the N poles 213, 233 of the first and the second magnets 21, 23 presses respectively against the first side 13 and the second side 14 of the magnetic induction element 10, the part of the N poles 213, 233 of the first and the second magnets 21, 23 near the top and bottom of the first and the second magnets 21, 23 partially presses against the two sides of the third and the fourth magnets 25, 27", the advantage of easy to assemble is even more prominent.

In addition, the width of the coil 30 is the same as the width of the third and fourth magnets 25, 27. As such, the coil 30 overlaps completely with the magnetic field, and the magnetic field is fully utilized.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A dual diamagnetic linear resonance actuator, comprising:
    a magnetic induction element having a first end, a second end, a first side, a second side opposite to the first side, a third side, and a fourth side opposite to the third side;
    a magnet set that comprises a first magnet; a second magnet; a third magnet; and a fourth magnet and that each have a S pole and a N pole, respectively, the N pole of the first magnet pressing against the first side of the magnet induction element, the N pole of the second magnet pressing against the second side of the magnet induction element, the S pole of the third magnet pressing against the third side of the magnet induction element, and the S pole of the fourth magnet pressing against the fourth side of the magnet induction element; and
    a coil surrounding the magnetic induction element, the third magnet and the fourth magnet, and maintaining a distance from the first end and the second end of the magnetic induction element, and from the N pole of the third magnet and the N pole of the fourth magnet,
    wherein the magnetic induction element has a thickness greater than that of each of the third magnet and the fourth magnet,
    wherein the first magnet and the second magnet have a size including length, width, and thickness that is equal, and the third magnet and the fourth magnet have a size including length, width, and thickness that is equal;
    wherein the magnet induction element, the third magnet and the fourth magnet have a combined thickness that is greater than that of each of the first magnet and the second magnet,
    wherein the thickness of the first magnet and the thickness of the second magnet include a top level and a bottom level, the third magnet has at least a half thickness portion thereof protruding above the top levels of the first magnet and the second magnet, and the fourth magnet has at least a half thickness portion thereof protruding below the bottom levels of the first magnet and the second magnet; and
    wherein the first magnet, the second magnet, the third magnet, and the fourth magnet each have a length that is equal to that of the magnetic induction element, the third magnet and the fourth magnet each have a width that is equal to that of the magnetic induction element, the N pole of the first magnet and the N pole of the second magnet each has a center that presses respectively against the first side and the second side of the magnetic induction element, and the N pole of the first magnet has a top portion that presses against a side of the third magnet and a bottom portion that presses against a side of the fourth magnet, and the N pole of the second magnet has a top portion that presses against another side of the third magnet and a bottom portion that presses against another side of the fourth magnet.

2. The dual diamagnetic linear resonance actuator as claimed in claim 1, wherein the magnetic induction element has a thickness equal to that of each of the first magnet and the second magnet.

3. The dual diamagnetic linear resonance actuator as claimed in claim 1, wherein the coil has a width that is equal to that of each of the third magnet and the fourth magnet.

4. The dual diamagnetic linear resonance actuator as claimed in claim 1, further comprising:
    an inner sliding track set that comprises at least two bases and a plurality of roller balls, the two bases being disposed respectively at the first magnet and the second magnet, and respectively forming a plurality of inner side tracks, and the roller balls being movably disposed at the plurality of inner side tracks; and
    an outer sliding track set that comprises two outer side tracks,
    wherein the coil is fixed to the two outer side tracks, and the roller balls respectively contact the two outer side tracks.

5. A dual diamagnetic linear resonance actuator, comprising:
- a magnetic induction element having a first end, a second end, a first side, a second side opposite to the first side, a third side, and a fourth side opposite to the third side;
- a magnet set that comprises a first magnet; a second magnet; a third magnet; and a fourth magnet and that each have a S pole and a N pole, respectively, the N pole of the first magnet pressing against the first side of the magnet induction element, the N pole of the second magnet pressing against the second side of the magnet induction element, the S pole of the third magnet pressing against the third side of the magnet induction element, and the S pole of the fourth magnet pressing against the fourth side of the magnet induction element; and
- a coil surrounding the magnetic induction element, the third magnet and the fourth magnet, and maintaining a distance from the first end and the second end of the magnetic induction element, and from the N pole of the third magnet and the N pole of the fourth magnet,
- wherein the magnetic induction element has a thickness greater than that of each of the third magnet and the fourth magnet,
- wherein the first magnet and the second magnet have a size including length, width, and thickness that is equal, and the third magnet and the fourth magnet have a size including length, width, and thickness that is equal,
- wherein the magnet induction element, the third magnet and the fourth magnet have a combined thickness that is equal to that of each of the first magnet and the second magnet, and
- wherein the first magnet, the second magnet, the third magnet, and the fourth magnet each have a length that is equal to that of the magnetic induction element, the third magnet and the fourth magnet each have a width that is equal to that of the magnetic induction element, the N pole of the first magnet and the N pole of the second magnet each has a center that presses respectively against the first side and the second side of the magnetic induction element, and the N pole of the first magnet has a top portion that presses against a side of the third magnet and a bottom portion that presses against a side of the fourth magnet, and the N pole of the second magnet has a top portion that presses against another side of the third magnet and a bottom portion that presses against another side of the fourth magnet.

6. The dual diamagnetic linear resonance actuator as claimed in claim 5, wherein the coil has a width that is equal to that of each of the third magnet and the fourth magnet.

7. The dual diamagnetic linear resonance actuator as claimed in claim 5, further comprising:
- an inner sliding track set that comprises at least two bases and a plurality of roller balls, the two bases being disposed respectively at the first magnet and the second magnet, and respectively forming a plurality of inner side tracks, and the roller balls being movably disposed at the plurality of inner side tracks; and
- an outer sliding track set that comprises two outer side tracks,
- wherein the coil is fixed to the two outer side tracks, and the roller balls respectively contact the two outer side tracks.

\* \* \* \* \*